(No Model.)

J. C. TAPPEINER.
POULTRY FOUNTAIN.

No. 294,932. Patented Mar. 11, 1884.

Witnesses,
Geo. H. Strong
G. H. Strong

Inventor,
J. C. Tappeiner
By Dewey & Co.
Attorneys.

UNITED STATES PATENT OFFICE.

JOHN C. TAPPEINER, OF BISBEE, ARIZONA TERRITORY.

POULTRY-FOUNTAIN.

SPECIFICATION forming part of Letters Patent No. 294,932, dated March 11, 1884.

Application filed July 20, 1883. (No model.)

*To all whom it may concern:*

Be it known that I, JOHN C. TAPPEINER, of Bisbee, county of Cochise, and Territory of Arizona, have invented an Improvement in Poultry-Fountains; and I hereby declare the following to be a full, clear, and exact description thereof.

My invention relates to certain improvements in poultry-fountains of that class in which water contained in a reservoir is allowed to escape by degrees into a shallow pan; and it consists in the combination of devices hereinafter described and claimed. The top of the reservoir is provided with a removable cap, and a perforated vessel is fixed or suspended within the reservoir, as will be more fully explained by reference to the accompanying drawings, in which—

Figure 2:
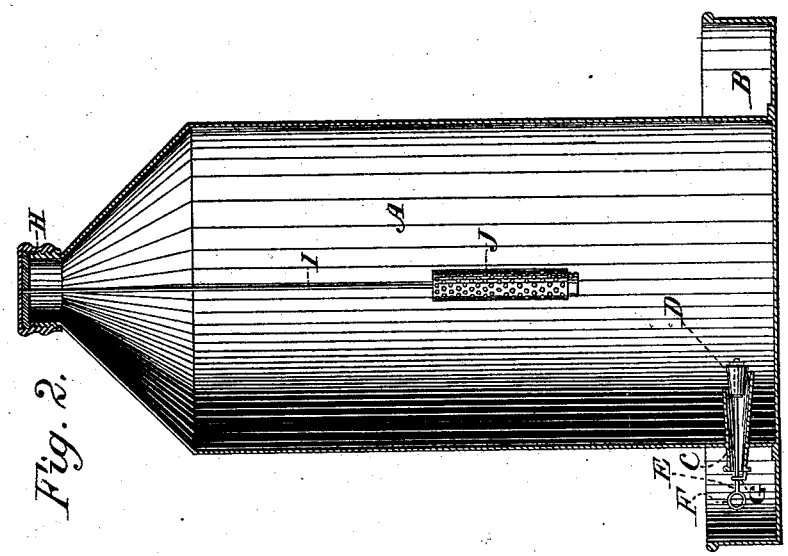
Figure 1:
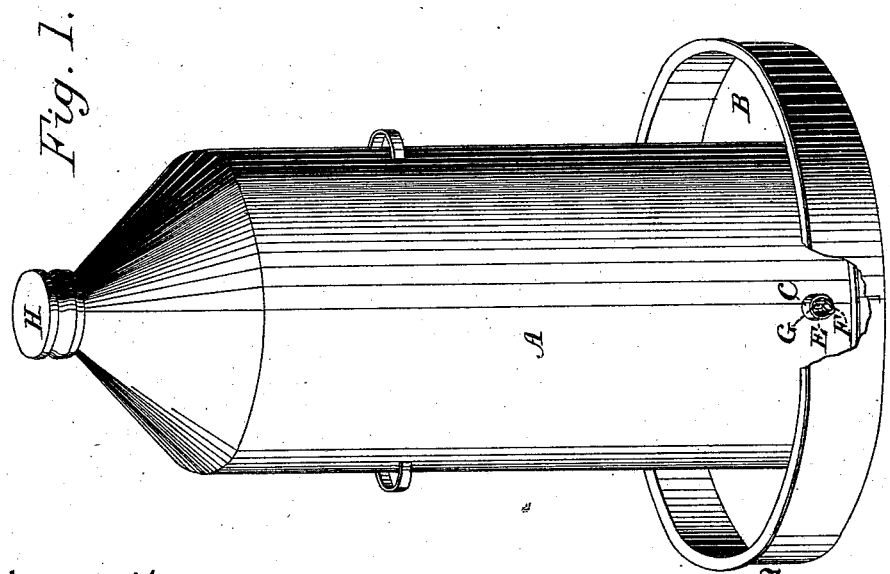

Figure 1 is a perspective view of my apparatus. Fig. 2 is a vertical section taken through the reservoir.

A is a reservoir, which may be cylindrical and of considerable height, and B is a shallow trough, which extends around the outside of the reservoir. C is a tube, made conical in shape, the larger end to the inside of the reservoir, and the smaller end extending out into the trough below the level of the rim. D is a conical stopper fitted to the inner end of this tube, and provided with a rod, E, which extends out through the tube and terminates in a loop or ring, F. A loop or hoop, G, is fixed to the mouth of the tube or other convenient point outside, so that ring F may be attached to it when desired. The reservoir has a screw-cap, H, with a rubber gasket, upon which it is screwed down to make a tight joint. From the center of the screw-cap a rod, I, extends downward, and a perforated cup or cage, J, is suspended from it. Into this cup sulphur or other substance for medicating the water may be placed whenever desired.

The operation of my fountain will be as follows: When it is to be filled, the stopper D is drawn forward into the tube C until it closes it tight. The screw-cap H is then removed and the reservoir filled. If it is desired to place sulphur or other material in the cage J, this may be done and the cap then replaced and screwed down tight. By pressing the rod E back, the stopper D is forced out of the tube, and the ring F is hooked over the catch G, thus preventing it from being forced forward, so as to again close the tube. The water will thus run out through the tube and fill the reservoir up to the level of the top of the tube, where it will remain until the reservoir is empty. This construction provides an easy way for filling or emptying the reservoir and for keeping the water in good condition.

Having thus described my invention, what I claim as new, and desire to secure by Letters Patent, is—

1. In a poultry-fountain, an elevated reservoir, a surrounding open trough with a tapering tube opening from the reservoir to the trough, and a stopper fitted to the inner end of said tube and having a rod or stem extending out through the tube, and a hook or catch by which the stopper may be held back, substantially as herein described.

2. In a poultry-fountain, an elevated reservoir having a surrounding open trough, a tube connecting the trough and fountain, and a stopper or valve, by which the tube may be opened or closed, in combination with a removable screw-cap at the top of the reservoir, a rod depending from said cap, and a cage or cup suspended from the rod, so as to be removed with the cap without allowing the contents of the reservoir to escape, substantially as herein described.

In witness whereof I have hereunto set my hand.

JOHN C. TAPPEINER.

Witnesses:
D. B. LEWIS,
H. S. WALKER.